US009052956B2

(12) United States Patent
Simitsis et al.

(10) Patent No.: US 9,052,956 B2
(45) Date of Patent: Jun. 9, 2015

(54) SELECTING EXECUTION ENVIRONMENTS

(75) Inventors: Alkiviadis Simitsis, Santa Clara, CA (US); William K Wilkinson, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 106 days.

(21) Appl. No.: 13/599,869

(22) Filed: Aug. 30, 2012

(65) Prior Publication Data

US 2014/0068550 A1 Mar. 6, 2014

(51) Int. Cl.
*G06F 9/44* (2006.01)
*G06F 9/50* (2006.01)

(52) U.S. Cl.
CPC ............ *G06F 9/5038* (2013.01); *G06F 9/5055* (2013.01)

(58) Field of Classification Search
USPC ......................................................... 717/105
See application file for complete search history.

(56) References Cited

U.S. PATENT DOCUMENTS

| | | | | |
|---|---|---|---|---|
| 5,557,761 A * | 9/1996 | Chan et al. | ...................... | 717/156 |
| 5,920,721 A * | 7/1999 | Hunter et al. | ................... | 717/159 |
| 6,964,029 B2 | 11/2005 | Poznanovic et al. | | |
| 7,299,458 B2 | 11/2007 | Hammes | | |
| 7,895,573 B1 * | 2/2011 | Bhargava et al. | ............. | 717/120 |
| 7,941,804 B1 * | 5/2011 | Herington et al. | ............ | 718/104 |
| 8,046,202 B1 | 10/2011 | Yang et al. | | |
| 8,146,081 B2 * | 3/2012 | Mizuno | .............................. | 718/1 |
| 8,271,999 B2 * | 9/2012 | Jones et al. | .................... | 719/320 |
| 8,506,402 B2 * | 8/2013 | Gault et al. | ....................... | 463/40 |
| 8,627,451 B2 * | 1/2014 | Walsh et al. | ..................... | 726/16 |
| 2002/0122062 A1 * | 9/2002 | Melamed et al. | .............. | 345/763 |
| 2003/0154158 A1 * | 8/2003 | Martyn et al. | ................... | 705/37 |
| 2005/0125772 A1 * | 6/2005 | Kohno | ........................... | 717/104 |
| 2006/0004523 A1 * | 1/2006 | Minor | ............................. | 702/19 |
| 2006/0158354 A1 | 7/2006 | Aberg et al. | | |
| 2007/0005283 A1 * | 1/2007 | Blouin et al. | .................. | 702/117 |
| 2007/0101328 A1 * | 5/2007 | Baron et al. | ................... | 718/100 |
| 2010/0318960 A1 * | 12/2010 | Bethea et al. | ................. | 717/106 |
| 2011/0196775 A1 * | 8/2011 | Gavin et al. | ..................... | 705/37 |
| 2013/0275323 A1 * | 10/2013 | Chuang | ........................ | 705/321 |

OTHER PUBLICATIONS

Ko et al. "Execution Monitoring of Security-Critical Programs in Distributed Systems: A Specification-based Approach", 1997, IEEE.*
Dijkstra, "Hierarchical Ordering of Sequential Processes", 1971, Springer-Verlag, pp. 115-138.*
Ranganathan et al., "Using Workflows to Coordinate Web Services in Pervasive Computing Environments", 2004, IEEE.*
Automatic Transformation From Graphical Process Models to Executable Code, Hauser, R. et al, May 6, 2010, http://e-collection.library.ethz.ch/eserv/eth:1177/eth-1177-01.pdf, on pp. 1-22.

* cited by examiner

*Primary Examiner* — Wei Zhen
*Assistant Examiner* — Junchun Wu
(74) *Attorney, Agent, or Firm* — Hewlett-Packard Patent Department

(57) ABSTRACT

Disclosed herein are techniques for selecting execution environments. Each operation in a sequence of operations is implemented using a selected execution environment. Each operation is converted into code executable in the selected execution environment. If some operations in the sequence were implemented in different execution environments, execution of the operations is coordinated.

19 Claims, 6 Drawing Sheets

|     | $e_1$ | $e_2$ | $e_3$ |
| --- | --- | --- | --- |
| $o_1$ | X | X |   |
| $o_2$ | ∞ | X | X |
| $o_3$ | X | X | X |
| $o_4$ | X | X |   |
| $o_5$ | X | X |   |
| f   | 0.8 | 1.0 | 0.4 |

*Fig. 5*

SELECTING EXECUTION ENVIRONMENTS

BACKGROUND

Many organizations maintain heterogeneous systems of information technology infrastructure comprising assorted data formats originating from multiple sources. For example, an organization may use a data warehouse to manage structured data and a map-reduce engine to manage semi-structured or unstructured data. Data warehouses may provide tools to extract, transform, and load data ("ETL tools"). Some ETL tools permit a user to specify operations that process data from multiple sources or to perform other functions. Such a tool may include a graphical user interface ("GUI") containing an object oriented model of the entities gathered from data sources for ETL processing.

BRIEF DESCRIPTION OF THE DRAWINGS

FIG. 5 is an example of an alternate data structure used for selecting execution environments in accordance with aspects of the present disclosure.

DETAILED DESCRIPTION

As noted above, ETL tools allow users to specify a sequence of operations that process data from various sources or that perform other types of functions. These tools may also convert user specified operations into executable code. However, as infrastructure and data become more diverse, an entire sequence of operations may not be suitable for just one execution environment. While some operations may be implemented in multiple execution environments, other operations may execute more efficiently in a particular environment. For example, in one operation, a map reduce cluster on a cloud network may be better suited for analyzing log files and, in a second operation, standard query language ("SQL") may be better suited for joining the results of the analyses with a data base table. As such, binding an entire process to one execution environment may result in suboptimal execution thereof.

In view of the foregoing, disclosed herein are a system, non-transitory computer readable medium, and method to select execution environments for each operation in a sequence. In one example, each operation in a sequence of operations may be implemented using a selected execution environment. In a further example, each operation may be converted into code executable in the selected execution environment. In yet a further example, if some operations in the sequence were implemented in different execution environments, execution of the operations may be coordinated. In another aspect, an execution environment may be defined as a context in which an operation is executed, such as an operating system, a database management system, a map reduce engine, or an operating system coupled with a hardware specification.

The system, non-transitory computer readable medium, and method disclosed herein may convert each operation of a process into code executable in different execution environments. As such, rather than binding every operation to one execution environment, an environment most suitable for each operation may be selected. As will be discussed further below, an execution environment may be selected based on a metric associated therewith. Furthermore, the techniques disclosed herein may accommodate operations only executable in particular environments. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
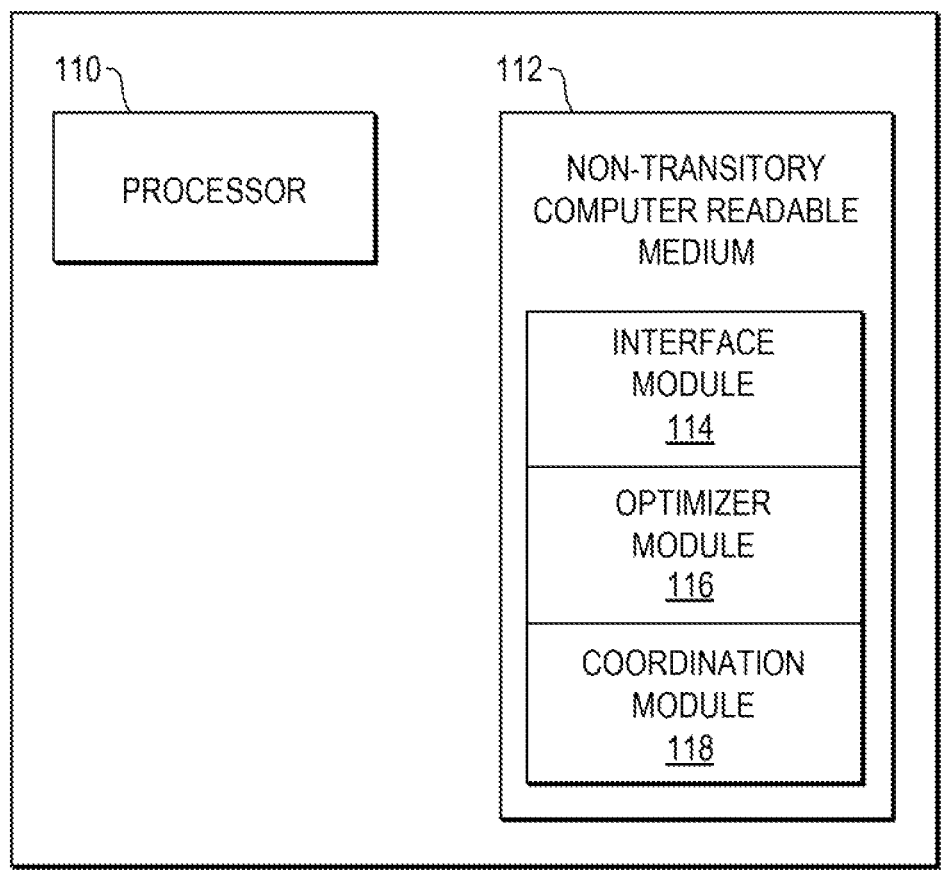
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as, a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. The instructions may include an interface module 114, an optimizer module 116, and a coordination module 118. In one example, non-transitory CRM 112 may be used by or in connection with any instruction execution system that can fetch or obtain the logic from non-transitory CRM 112 and execute the instructions contained therein. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

As will be described in more detail below, the instructions in interface module 114 may cause processor 110 to display a GUI that permits users to specify a sequence of operations and to request conversion thereof into executable code. Optimizer module 116 may convert each operation into code executable in a selected execution environment. In one example, selection of the execution environment may be at least partially based on resources consumed by each operation when executed therein. Coordination module 118 may ensure the operations execute in a proper sequence, when some operations are implemented in execution environments different than other operations. In one example, optimizer module 116 may determine that the sequence is more efficient in an order different than that specified by the user. Selection of the execution environment may be further based on the resources consumed when the sequence of operations is coordinated across different execution environments.

Figure 2:
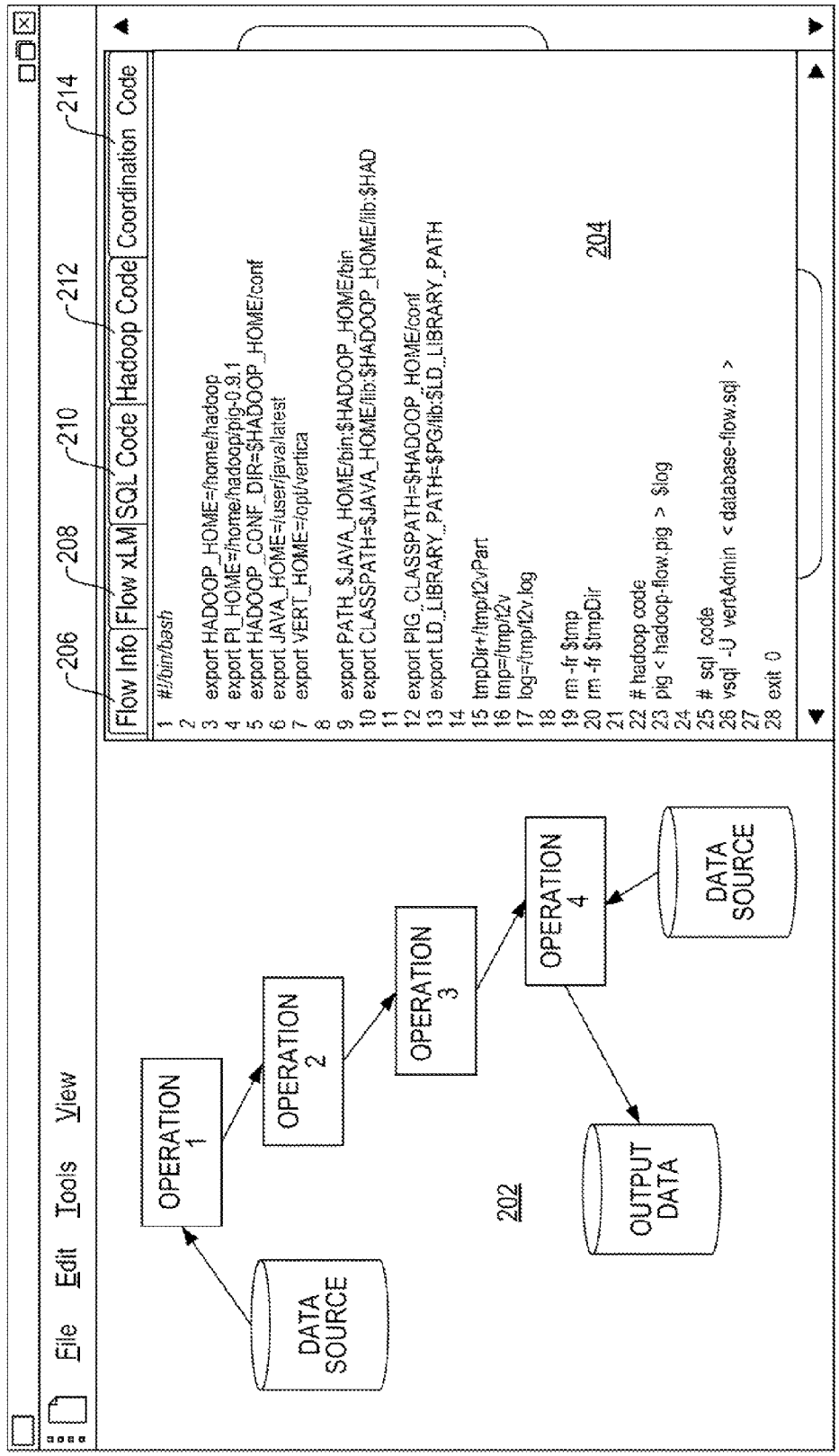
FIG. 2 is a working example of a graphical user interface in accordance with aspects of the present disclosure.

FIG. 2 illustrates an example GUI 200 that may be displayed in accordance with the instructions of interface module 114. The illustrative GUI 200 may have a left panel 202 in which a user may specify a sequence of operations by clicking and dragging icons representative of operations or data sources. In this example, left panel 202 displays four specified operations. Operation one and operation four are each shown having an external data input. Operations two thru four are each shown receiving input from a preceding operation. Operation four is also shown producing a final output of the sequence. The right panel 204 may display information associated with a tab positioned above the panel. In this example, right panel 204 is currently displaying information associated with coordination tab 214. Upon clicking coordination tab 214, right panel 204 may display executable code that coordinates each operation in the process displayed in left panel 202, when some operations are implemented in different execution environments.

A user clicking on flow information tab 206 may cause meta-data associated with the specified operations to be shown in right panel 204. A click on flow information tab 206 may also cause other information to be shown, such as a graph representation of the sequence of operations. A user clicking on xLM tab 208 may cause customized extendable markup language ("XML") code to be displayed in right panel 204. Such code may represent the sequence of operations specified in left panel 202. The "xLM" code may capture information regarding data structures used to implement the sequence of operations (e.g., nodes and edges of a graph or hierarchical tree of interlinked nodes). The "xLM" code may also capture design meta-data (e.g., functional and non-functional requirements or resource allocation). In another example, the "xLM" code may capture operational properties (e.g., operation type, data schema, operation statistics, parameters or expressions for implementing an operation type, or execution environment details). A user clicking on standard query language ("SQL") tab 210 may cause the display of SQL code in right panel 204. Such SQL code may be used to implement some operations in left panel 202 as determined by optimizer module 116. A user clicking on Hadoop tab 212 may cause Hadoop code to be displayed in right panel 204. As with the aforementioned SQL code, optimizer module 116 may determine that some operations specified in left panel 202 should be implemented in Hadoop. As such, once the execution environments are selected, GUI 200 may display tabs that permit a user to view or edit the generated code executable therein.

Figure 3:
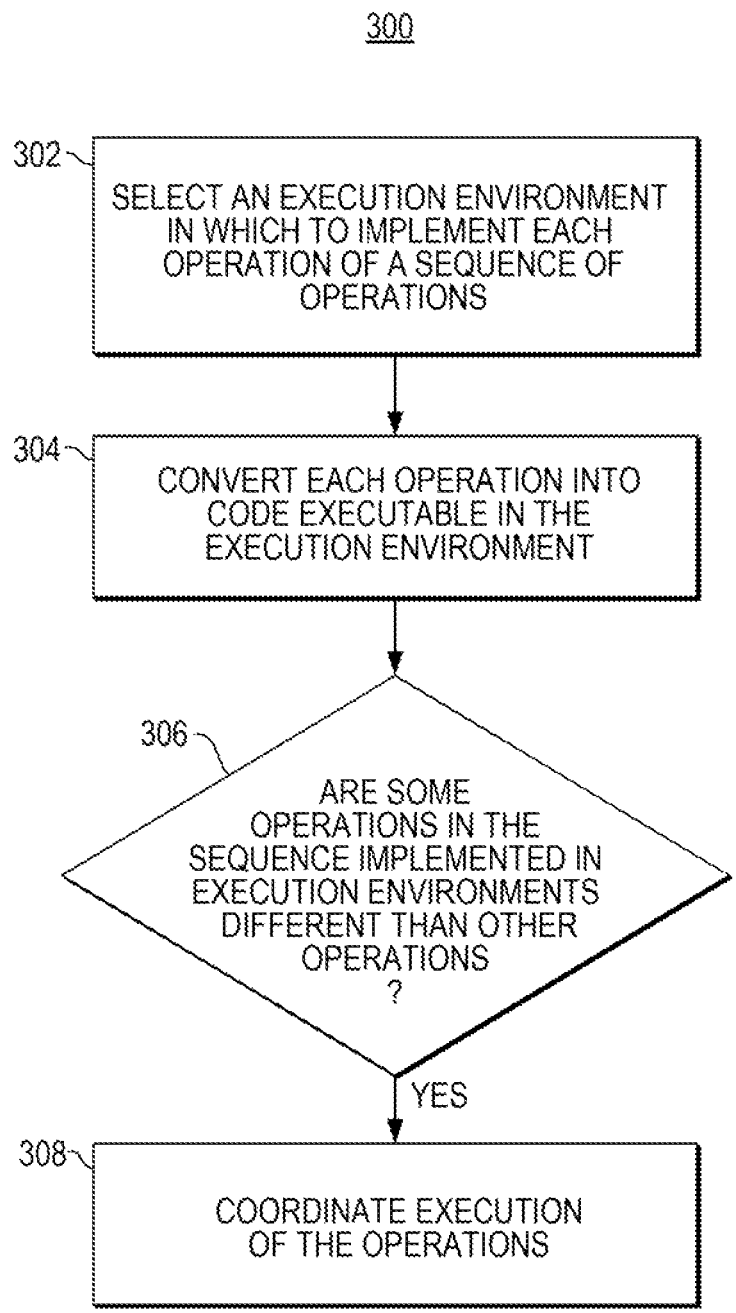
FIG. 3 is a flow diagram of an example method in accordance with aspects of the present disclosure.
Figure 4:
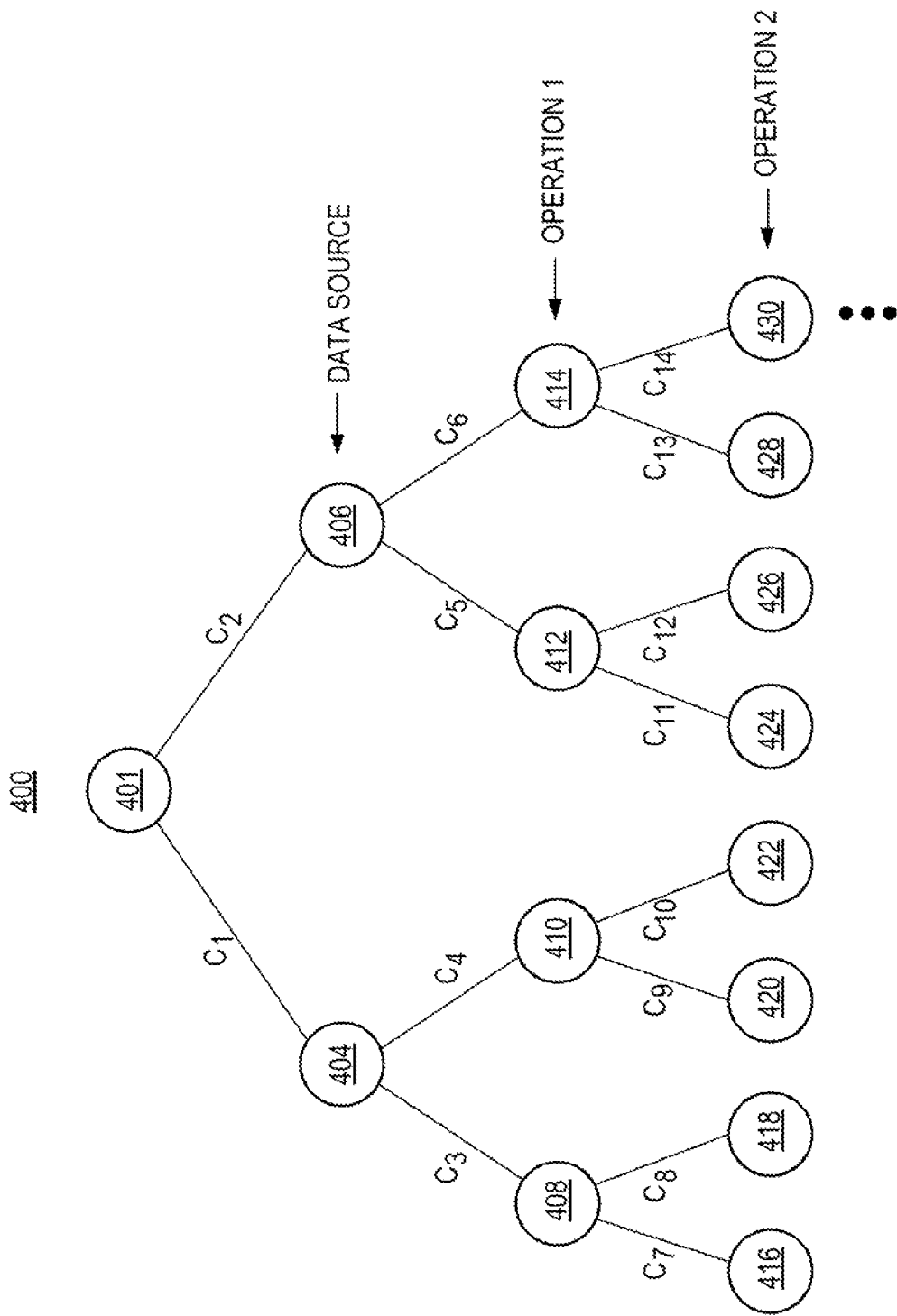
FIG. 4 is an example data structure used for selecting execution environments in accordance with aspects of the present disclosure.
Figure 5:
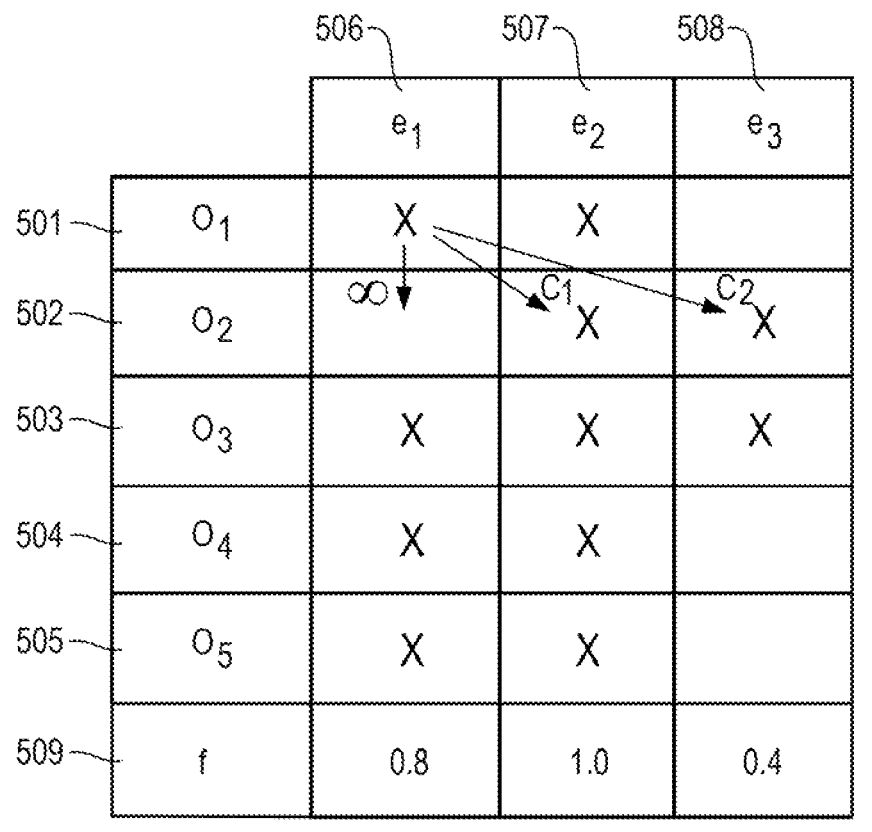

Working examples of the system, method, and non-transitory computer-readable medium are shown in FIGS. 3-5. In particular, FIG. 3 illustrates a flow diagram of an example method 300 for selecting execution environments. FIGS. 4-5 each show a different working example in accordance with the techniques disclosed herein.

As shown in block 302 of FIG. 3, an execution environment in which to implement each operation in a sequence of operations may be selected. In one example, the selection may be triggered by a request to convert a sequence of user-specified operations into executable code. Such a request may be initiated by a user via GUI 200. Selection of the execution environment may be based on a metric associated therewith. The metric may be partially based on resources consumed by each operation when implemented in the execution environment and/or resources consumed when the sequence of operations is coordinated across different execution environments. Such metrics may be stored as standing data that may be configured in advance by an administrator. Furthermore, such metrics may be derived by executing benchmark programs in each candidate execution environment.

Referring again to FIG. 3, each operation may be converted into code executable in the execution environment selected for each operation, as shown in block 304. As will be discussed in more detail below, the metric associated with each execution environment may be processed using various data structures (e.g., graphs, hierarchical trees, etc.). In block 306, it may be determined whether some operations in the sequence are implemented in execution environments different than other operations. If it is determined that some operations in the sequence are implemented in execution environments different than other operations, execution of the operations may be coordinated, as shown in block 308.

FIG. 4 shows an example hierarchical data structure of interlinked nodes that may be used to determine an execution environment for each operation. Root node 401 may represent the start of the process and each level in the hierarchical tree may be associated with an operation in the sequence or data processed thereby. A node in the tree may represent an execution environment that is a candidate for executing the operation corresponding to each level. Alternatively, a node in the tree may represent an execution environment in which a data source may be loaded. In the example of FIG. 4, the first level in the tree represents a data source. Each node in this first level (i.e., nodes 404 and 406) represents an execution environment that is a candidate for storing the type of data corresponding to the first level. Each link associating a pair of nodes in the tree may represent a cost of transitioning between nodes (i.e., the cost of transitioning from one environment to another). As such, each link may represent a metric associated with each candidate execution environment. The link $C_1$ may represent the cost of loading the data into execution environment 404 and $C_2$ may represent the cost of loading the data into execution environment 406. A path from the root node to a leaf node may represent a combination of execution environments that may be used to implement the sequence of operations.

The second level in the hierarchical tree of FIG. 4 may represent the first operation in the sequence. Nodes 408, 410, 412, and 414 are shown as candidate environments for executing this first operation. These second level nodes each have a cost metric associated therewith, namely $C_3$, $C_4$, $C_5$, and $C_6$ respectively. The second operation has eight candidate execution environments (i.e., 416-430) each associated with a cost $C_7$ thru $C_{14}$ respectively. In one example, optimizer module 116 may select the least cost path of interlinked nodes from the root node to a leaf node. Therefore, the path may include different execution environments or may include the same execution environment, if it is determined that executing each operation in the same environment has the least cost than other execution paths.

FIG. 5 shows an alternative representation that may be used to select an execution environment for each operation. In one example, the matrix data structure shown in FIG. 5 may be generated from a hierarchical tree of interlinked nodes after removing or "pruning" sections of the tree whose aggregate cost exceed a predetermined threshold. In this example, each row 501-505 may represent an operation and each column 506-508 may represent a candidate execution environment. Each cell flagged with an "X" may indicate that the execution environment corresponding to the column thereof is a candidate for executing the operation corresponding to a given row. Each arrow projecting from the cell $[e_1, O_1]$ may represent a cost of transitioning from an implementation of $O_1$ in execution environment $e_1$ to an implementation of $O_2$ in another execution environment. The cost of transitioning from $[e_1, O_1]$ to $[e_1, O_2]$ is shown as infinity, since $e_1$ is not a candidate for executing operation $O_2$. However $C_1$ may represent the cost of transitioning from $[e_1, O_1]$ to $[e_2, O_2]$ and $C_2$ may represent the cost of transitioning from $[e_1, O_1]$ to $[e_3, O_2]$.

In another example, the selection of an execution environment may be at least partially based on whether an execution environment was previously selected to execute more operations in the sequence than any other candidate execution environment. In the example matrix data structure of FIG. 5, each column of row 509 depicts a ratio of operations $O_1$ thru $O_5$ that were previously executed in the environment corresponding to each column. In this example, row 509 indicates that execution environment $e_1$ was previously used to execute eighty percent of the operations in the sequence; execution environment $e_2$ was previously used to execute one hundred percent of the operations in the sequence; and, execution environment $e_3$ was previously used to execute forty percent of the operations in the sequence. Thus, if an execution environment is undeterminable based on a preferred metric, an execution environment previously selected to execute more operations than any other candidate may be selected instead. In the example in FIG. 5, $e_2$ may be selected since it was previously used to execute one hundred percent of the sequence. However, in another example, other metrics may considered if the execution environment is undeterminable based on a preferred metric, such as licensing costs, total number of operations executable therein, utilization thereof, etc.

Figure 6:
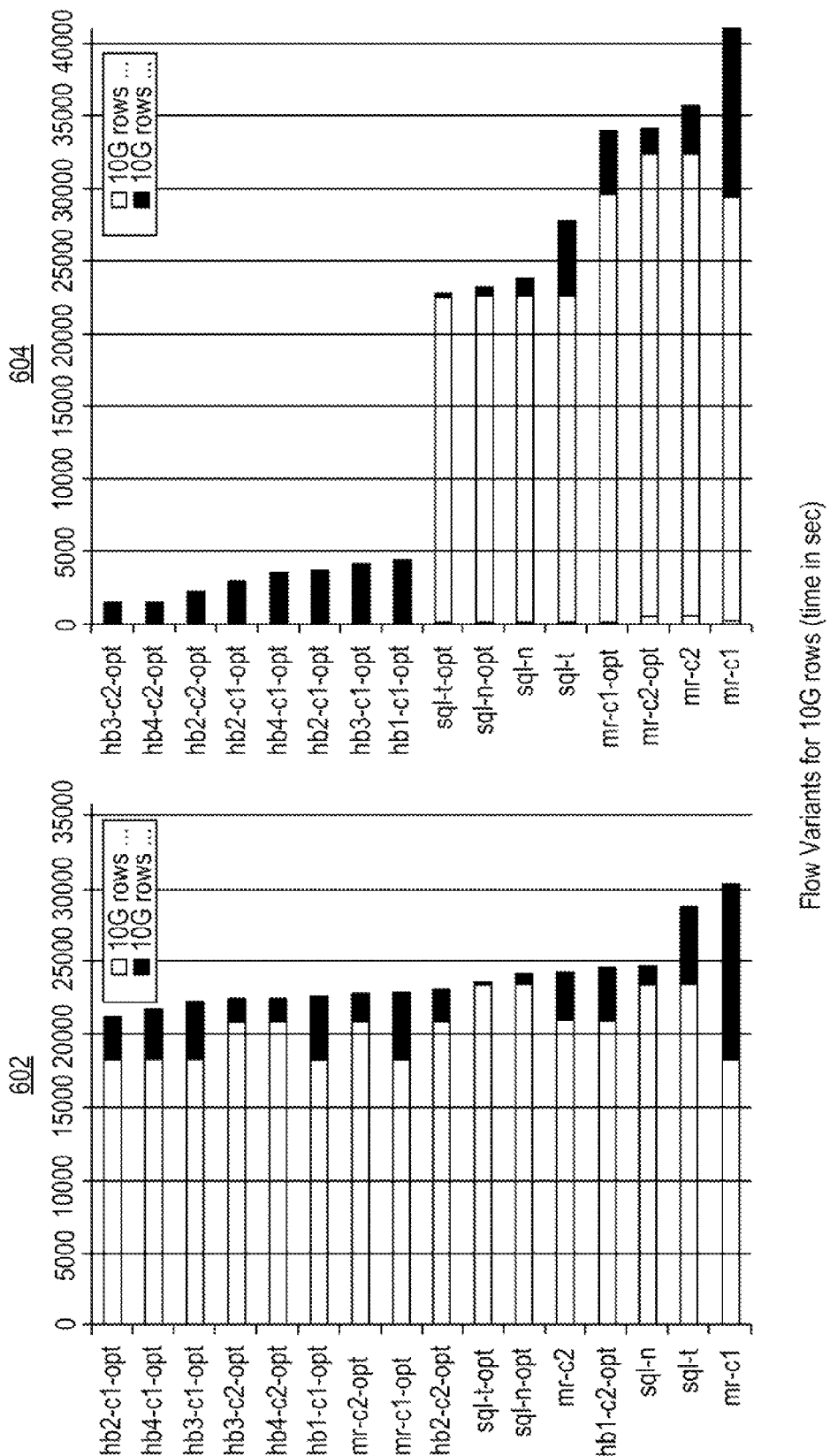
FIG. 6 is a bar graph illustrating the performance of various example execution environments.

FIG. 6 depicts two example graphs 602 and 604 that demonstrate the differences in execution times between various example execution environments. Execution environments prefixed with "mr" represent map reduce execution environments; the environments prefixed with "sql" represent SQL execution environments; and, the environments prefixed with "hb" represent a hybrid of different execution environments. These metrics may be used as standing data that may be configured in advance by an administrator. Each bar in graph 602 corresponds to an execution environment, and the length of each bar represents a total time in seconds of executing a sequence of operations on 10 gigabyte rows of data plus the time of loading the data, when executed in a corresponding execution environment. Thus, each bar in graph 602 assumes the data is stored outside the execution environment corresponding to each bar. The white portion of each bar in graph 602 represents the cost of loading the data and the black portion of each bar represents the cost of executing the operations. In graph 604, the length of each bar therein represents a total time in seconds of executing a sequence of operations on 10 gigabyte rows of data plus the time to forward any data to a subsequent execution environment, when the sequence is executed in an environment corresponding to each bar. Thus, each bar in graph 604 assumes the data is stored in a corresponding execution environment and accounts for data forwarded to a subsequent operation. The white portion of each bar in graph 602 represents the cost of forwarding the data and the black portion of each bar represents the cost of executing the operations.

Advantageously, the foregoing system, method, and non-transitory computer readable medium convert a process with different operations into code executable in different execution environments. Instead of executing an entire process in one environment, various execution environments may be used that execute a given operation most efficiently. In this regard, the overall process may be optimized and end users of the resulting process may experience better performance.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
   an interface module to permit a sequence of operations to be specified by a user;
   an optimizer module to implement each operation in a selected execution environment and to convert each operation into code executable therein;
   a module to determine an execution environment from a plurality of candidate execution environments in which to implement each operation such that selection of the execution environment is based at least partially on a metric associated therewith,
   wherein the metric associated with the execution environment is at least partially based on resources consumed by each operation when implemented in the execution environment and resources consumed when the sequence of operations is coordinated across different execution environments;
   wherein the selected execution environment is represented by a node of a hierarchical tree, the tree including a plurality of nodes representing candidate execution environments that are candidates for executing each operation;
   and a coordination module to ensure the operations execute in the sequence specified by the optimizer module when some operations are implemented in execution environments different than other operations in the sequence.

2. The system of claim 1, wherein selection of the execution environment is at least partially based on resources consumed by each operation when executed therein.

3. The system of claim 2, wherein selection of the execution environment is further based on resources consumed when the sequence of operations is coordinated across different execution environments.

4. The system of claim 1, wherein selection of the execution environment is at least partially based on whether the execution environment was previously selected to execute more operations in the sequence than any other candidate execution environment.

5. The system of claim 1, wherein the plurality of nodes of the hierarchical tree include interlinked nodes to represent the plurality of execution environments that are candidates for executing each operation.

6. The system of claim 5, wherein a level in the hierarchical tree of interlinked nodes is associated with an operation in the sequence or data processed thereby and wherein each node within the interlinked nodes positioned at each level represents a candidate execution environment.

7. The system of claim 6, wherein each link associating a pair of nodes in the hierarchical tree of interlinked nodes represents a cost of transitioning between the pair of nodes and the optimizer module is further to select a least cost path of interlinked nodes.

8. A non-transitory computer readable medium having instructions therein which, if executed, cause a processor to:
  read a request to convert a sequence of operations into executable code;
  determine an execution environment from a plurality of candidate execution environments in which to implement each operation such that selection of the execution environment is based at least partially on a metric associated therewith,
  wherein the metric associated with the execution environment is at least partially based on resources consumed by each operation when implemented in the execution environment and resources consumed when the sequence of operations is coordinated across different execution environments;
  wherein the determined execution environment is represented by a node of a hierarchical tree, the tree including a plurality of nodes representing the plurality of candidate execution environments;
  generate code executable in the execution environment selected for each operation in the sequence; and if some operations are implemented in execution environments different than other operations in the sequence, coordinate execution of the sequence of operations across different execution environments.

9. The non-transitory computer readable medium of claim 8, wherein the metric associated with the execution environment is at least partially based on whether the execution environment was previously selected to execute more operations in the sequence than any other candidate execution environment.

10. The non-transitory computer readable medium of claim 8, wherein the plurality of nodes of the hierarchical tree include interlinked nodes to represent the plurality of candidate execution environments, such that the plurality of candidate execution environments are candidates for executing each operation.

11. The non-transitory computer readable medium of claim 10, wherein a level in the hierarchical tree of interlinked nodes is associated with an operation in the sequence or data processed thereby and wherein each node within the interlinked nodes represents a candidate execution environment.

12. The non-transitory computer readable medium of claim 11, wherein each link associating a pair of nodes in the hierarchical tree of interlinked nodes represents a cost of transitioning between the pair of nodes.

13. A method comprising:
  displaying, using a processor, an interface that allows a user to specify a series of operations associated with data;
  reading, using the processor, a request from the user via the interface to convert a sequence of operations into executable code;
  selecting, using the processor, an execution environment from a plurality of execution environments in which to implement each operation in the sequence;
  Determining, using the processor, an execution environment from a plurality of candidate execution environments in which to implement each operation such that selection of the execution environment is based at least partially on a metric associated therewith,
  wherein the metric associated with the execution environment is at least partially based on resources consumed by each operation when implemented in the execution environment and resources consumed when the sequence of operations is coordinated across different execution environments;
  wherein the selected execution environment is represented by a node of a hierarchical tree, the tree including a plurality of nodes representing the plurality of candidate execution environments;
  converting, using the processor, each operation into code executable in the selected execution environment; and if some operations are implemented in execution environments different than other operations in the sequence, coordinating, using the processor, the sequence of operations across different execution environments.

14. The method of claim 13, wherein selection of the execution environment is at least partially based on resources consumed by each operation when implemented in the execution environment and resources consumed when the sequence of operations is coordinated across different execution environments.

15. The method of claim 13, wherein selection of the execution environment is at least partially based on whether the execution environment was previously selected to execute more operations in the sequence than any other candidate execution environment.

16. The method of claim 13, further comprising arranging, using the processor, the plurality of nodes of the hierarchical tree into interlinked nodes to represent the plurality of candidate execution environments, such that the plurality of candidate execution environments are candidates for executing each operation.

17. The method of claim 16, wherein a level in the hierarchical tree of interlinked nodes is associated with an operation in the sequence or data processed thereby and wherein each node within the interlinked nodes represents a candidate execution environment.

18. The method of claim 17, wherein each link associating a pair of nodes in the hierarchical tree of interlinked nodes represents a cost of transitioning between the pair of nodes.

19. The method of claim 18, further comprising, selecting, using the processor, a least cost path of interlinked nodes.

* * * * *

UNITED STATES PATENT AND TRADEMARK OFFICE
CERTIFICATE OF CORRECTION

| | |
|---|---|
| PATENT NO. | : 9,052,956 B2 |
| APPLICATION NO. | : 13/599869 |
| DATED | : June 9, 2015 |
| INVENTOR(S) | : Alkiviadis Simitsis et al. |

It is certified that error appears in the above-identified patent and that said Letters Patent is hereby corrected as shown below:

In The Claims

In column 8, line 13, in Claim 13, delete "Determining" and insert -- determining --, therefor.

Signed and Sealed this
Fifteenth Day of December, 2015

Michelle K. Lee
*Director of the United States Patent and Trademark Office*